US010816099B2

(12) United States Patent
Lauer et al.

(10) Patent No.: US 10,816,099 B2
(45) Date of Patent: Oct. 27, 2020

(54) SPOOL VALVE

(71) Applicant: Eaton Intelligent Power Limited, Dublin (IE)

(72) Inventors: Peter Maria Lauer, Eden Prairie, MN (US); Rahul Navale, Plymouth, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/999,067

(22) Filed: Aug. 15, 2018

(65) Prior Publication Data

US 2019/0056036 A1 Feb. 21, 2019

Related U.S. Application Data

(60) Provisional application No. 62/545,886, filed on Aug. 15, 2017.

(51) Int. Cl.
*F16K 11/07* (2006.01)
*F15B 13/04* (2006.01)
(Continued)

(52) U.S. Cl.
CPC .......... *F16K 11/0712* (2013.01); *F15B 11/04* (2013.01); *F15B 13/0402* (2013.01);
(Continued)

(58) Field of Classification Search
CPC ............ F16K 11/0712; F16K 11/0708; F16K 11/0785; F16K 31/0679; F16K 31/0613;
(Continued)

(56) References Cited

U.S. PATENT DOCUMENTS 3,470,692 A 10/1969 Kamp
4,646,785 A * 3/1987 Ruedle .................. F16K 27/041
137/625.64

(Continued)

FOREIGN PATENT DOCUMENTS

EP 2772373 A2 9/2014
GB 2419195 A 4/2006

OTHER PUBLICATIONS

"AxisPro Servo conversion instructions," White Paper, Eaton, 12 pages.

(Continued)

*Primary Examiner* — Jessica Cahill
*Assistant Examiner* — Patrick C Williams
(74) *Attorney, Agent, or Firm* — Merchant & Gould P.C.

(57) ABSTRACT

A valve includes a bore within a valve body having a central axis. A plurality of galleries in the bore define flow paths for hydraulic fluid. A spool is positioned in the bore, and the spool is moveable along the central axis between a first position in which hydraulic fluid from a central pump gallery is prevented from flowing to first and second working galleries and from flowing to one or more tank galleries; a second position in which hydraulic fluid from the central pump gallery is in fluid communication with both the first and second working galleries simultaneously; and a third position in which the first and second working galleries are in fluid communication with the one or more tank galleries simultaneously.

19 Claims, 11 Drawing Sheets

(51) Int. Cl.
*F16K 31/06* (2006.01)
*F16K 27/02* (2006.01)
*F16K 11/04* (2006.01)
*F16K 11/078* (2006.01)
*F15B 11/04* (2006.01)

(52) U.S. Cl.
CPC ...... *F16K 11/0708* (2013.01); *F16K 27/0263* (2013.01); *F16K 31/0613* (2013.01); *F16K 31/0679* (2013.01); *F15B 2013/0412* (2013.01); *F15B 2211/3057* (2013.01); *F15B 2211/3127* (2013.01); *F15B 2211/3133* (2013.01); *F15B 2211/31576* (2013.01); *F15B 2211/35* (2013.01); *F16K 11/0785* (2013.01)

(58) Field of Classification Search
CPC .. F16K 27/0263; F15B 13/0402; F15B 11/04; F15B 2211/35; F15B 2211/31576; F15B 2211/3057; F15B 2211/3127; F15B 2211/3133; F15B 2013/0412
See application file for complete search history.

(56) References Cited

U.S. PATENT DOCUMENTS

| | | | |
|---|---|---|---|
| 8,464,756 B2 | 6/2013 | Navale | |
| 9,482,352 B2 | 11/2016 | West et al. | |
| 9,568,052 B2 | 2/2017 | Maurer et al. | |
| 2014/0245732 A1* | 9/2014 | Bauer | F16K 11/07 60/463 |

OTHER PUBLICATIONS

"Configuring the AxisPro Level 1 Valve", Mar. 2015, 6 pages.
"Eaton AxisPro™ Industrial Valve and Pro-FX Configure for AxisPro™™ User Manual," Eaton Corporation, 2014, 254 pages.
"Eaton Servo-Performance Proportional Directional Valve, AxisPro™," KBH-08 10 Series, E-VLPO-CC001-E1, May 2016, 22 pages.
"Eaton Servo-Performance Proportional Directional Valve, AxisPro™," KBH*-05 10 Series, E-VLPO-TT002-E, May 2016, 22 pages.
"Eaton Servo-Performance Proportional Directional Valve, AxisPro™," KBS*-05 10 Series, E-VLPO-MC003-E3, Aug. 2015, 24 pages.
"Eaton Servo-Performance Proportional Directional Valve, AxisPro™," KBS*-03 10 Series, E-VLPO-MC002-E43, Aug. 2015, 24 pages.
"Eaton / Vickers, Proportional Two-Stage Directional Valves High Performance with Main Stage Spool Feedback, Pressures to 350 bar (5000 psi)," KBFDG5V-5/7/8110 Series, V-VlLDI-MC0003-E2, Feb. 2010, 20 pages.
International Search Report and Written Opinion of the International Searching Authority, PCT/IB2018/056148, dated Dec. 13, 2018, 15 pages.

\* cited by examiner

SPOOL VALVE

CROSS-REFERENCE TO RELATED APPLICATION

This application claims the benefit of U.S. Patent Application Ser. No. 62/545,886, filed on Aug. 15, 2017, the disclosure of which is incorporated herein by reference in its entirety.

INTRODUCTION

Spool valves control the direction of flow of a hydraulic fluid by moving a spool axially along a longitudinal axis within a bore of a valve housing. Spool valves are commonly used to control fluid communication between a pump and a hydraulic actuator (e.g., a hydraulic piston, a hydraulic motor, etc.). Movement of the spool opens and closes fluid communication between various ports defined by the valve housing to direct the hydraulic fluid along various flow paths.

SUMMARY

The present disclosure relates generally to a spool valve for controlling the flow of a hydraulic fluid, and more specifically to a spool for the spool valve.

In one aspect, the disclosed technology relates to a valve including a body defining a bore having a central axis and first and second work galleries defined by a plurality of walls. A spool is positioned within the bore, and the spool includes a central body portion having a central body portion diameter, and a central sealing land positioned between first and second outside sealing lands on the central body portion, each sealing land has a sealing land diameter larger than the central body portion diameter. A first sealing relationship between the spool and the bore allows fluid to flow from a central pump gallery into both the first and second work galleries simultaneously. In one example, the first and second work galleries are connected to a service port of a hydraulic cylinder. In another example, the valve further includes first and second tank galleries, and a second sealing relationship between the spool and the bore allows fluid to flow from the first and second work galleries into the first and second tank galleries simultaneously.

In one example, the central sealing land has an axial length that is about 10% to about 100% of an axial length of the first outside sealing land. In another example, the central sealing land has an axial length that is about 10% to about 100% of an axial length of the second outside sealing land. In another example, the central body portion diameter is about 10% to about 99% the sealing land diameter. In one example, the central body portion includes a central segment between the central sealing land and the first outside sealing land, a first outside segment between the first outside sealing land and a first peripheral sealing land, and a second outside segment between the second outside sealing land and a second peripheral sealing land. In one example, the central segment has an axial length that is about 10% to about 100% an axial length of the first outside segment. In another example, the central segment has an axial length that is about 10% to about 100% an axial length of the second outside segment.

In one example, the valve further includes one or more solenoids, wherein each solenoid is adjacent to a peripheral sealing land positioned on the central body portion of the spool. The one or more solenoids are configured to axially displace the spool along the central axis.

In one example, the valve is a proportional 3/2 way hydraulic valve. In another example, the valve is a CETOP 5 hydraulic valve. In another example, the valve is a switching hydraulic valve. In one example, at least one of the sealing lands includes one or more notches around an edge of a surface perpendicular to the central body portion of the spool. In another example, the valve further includes a sleeve located between the body and the spool. In one example, the valve is a high flow servo valve.

In another aspect, the disclosed technology relates to a valve including a bore within a valve body having a central axis, a plurality of galleries in the bore that define flow paths for hydraulic fluid, and a spool positioned in the bore. The spool is moveable along the central axis between a first position in which hydraulic fluid from a central pump gallery is prevented from flowing to first and second work galleries and from flowing to one or more tank galleries; a second position in which hydraulic fluid from the central pump gallery is in fluid communication with both the first and second work galleries simultaneously; and a third position in which the first and second work galleries are in fluid communication with the one or more tank galleries simultaneously. In one example, the valve is a proportional hydraulic valve. In another example, the valve is a switching hydraulic valve. In another example, the valve is a high flow servo valve.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

The technology described below has application in systems that utilize hydraulic actuators. In one possible configuration and by non-limiting example, the hydraulic actuator is a hydraulic cylinder that includes an displaceable piston for providing a unidirectional force when actuated by a hydraulic fluid. Such hydraulic actuators are commonly used in industrial equipment and construction equipment (e.g., excavators, booms, lifts, swing arms, pivot mechanisms, etc.). It is contemplated, however, that the actuator can be any type of hydraulic actuator including, for example, a hydraulic motor.

Figure 1:
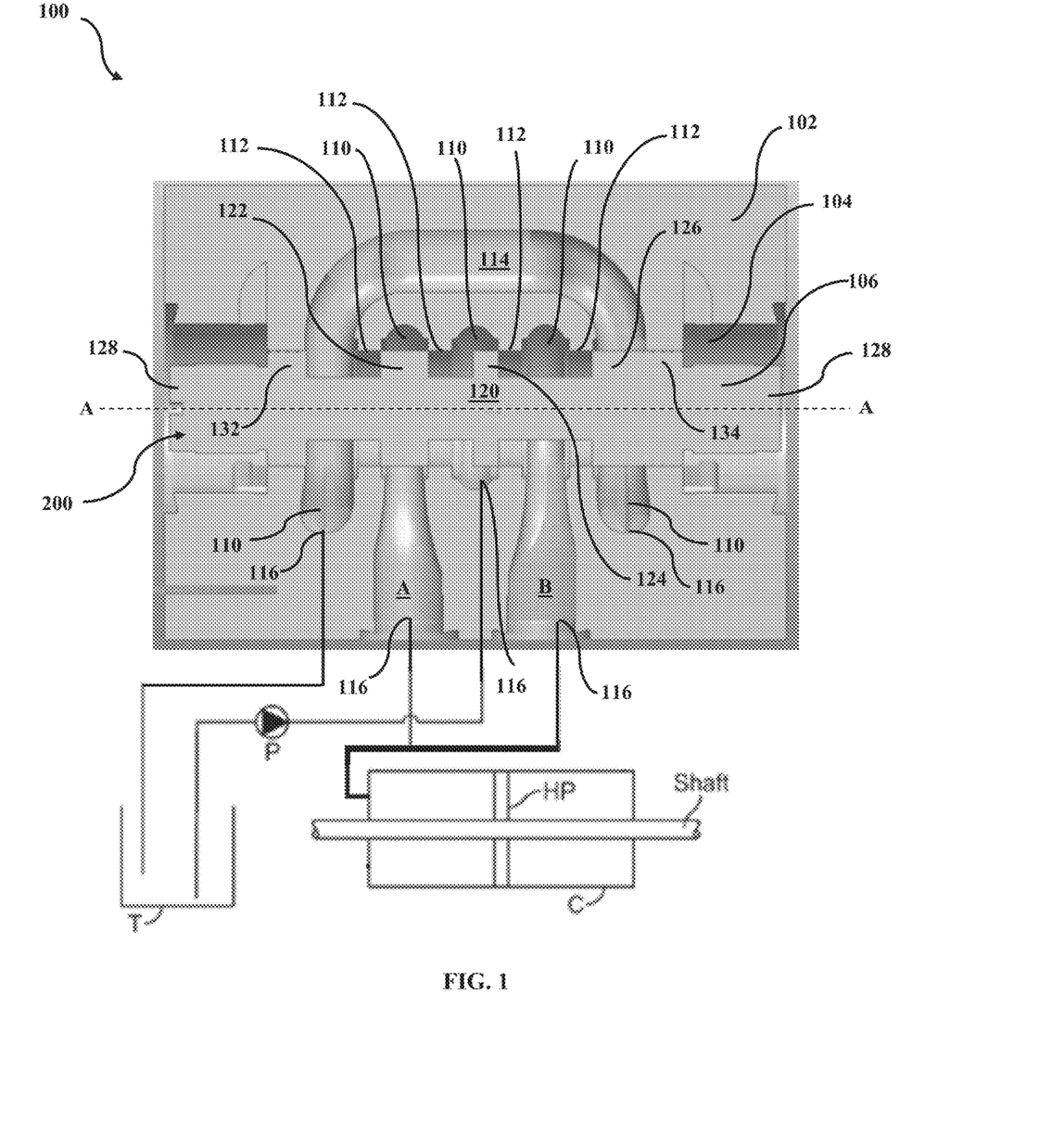
FIG. 1 is a side sectional view of an exemplary spool valve in a first position.

FIG. 1 is a side sectional view of a spool valve 100 in a first position 200. The spool valve 100 includes a spool valve body 102 defining a bore 104. A spool 106 is located within the bore 104. The bore 104 is surrounded by a number of galleries 110 that define flow paths for hydraulic fluid depending on the position of the spool 106. The spool 106 is axially moveable along a body axis A-A of the spool valve body 102, either via electronic or manual controls. In one example, solenoids 128 are positioned on either side of the spool 106 such that when a right-side solenoid 128 is activated, the spool 106 is pushed to the left side of the bore 104, and when a left-side solenoid 128 is activated, the spool 106 is pushed to the right side of the bore 104.

The shape of each gallery 110 is that of an annular cavity that is open on its inner side to the bore 104. Each gallery 110 is separated by a wall 112 and is connected to a port 116 which connects to a particular hydraulic system component via a dedicated hydraulic fluid line. The outer-most galleries 110 are tank galleries that are connected to one or more hydraulic fluid reservoirs or tanks T. A pressure equalizing channel or flow passage 114 connects the tank galleries 110 together. A central pump gallery 110 connects to a pump P outlet for delivery of hydraulic fluid to the bore 104. The other galleries 110 are first and second work galleries connected to service ports A and B of a hydraulic actuator. A flow arrangement merges the flow of hydraulic fluid from the service ports A and B before it reaches the hydraulic actuator. In the example embodiment depicted in FIG. 1, the hydraulic actuator is a cylinder C having a hydraulic piston HP disposed therein. The gallery and port configuration depicted and described herein is exemplary, and it is contemplated that the spool 106 may be used in spool valves having a different number and/or configuration of galleries and ports as needed or desired for a particular application.

Referring still to FIG. 1, the spool 106 includes a number of sealing lands 122, 124, 126 that project radially outward from the spool 106 for sealing the various galleries 110 during operation of the spool valve 100. In this manner, the spool valve 100 controls the various flow paths defined by the galleries 110 by utilizing the sealing lands on the spool 106 that each include a diameter substantially equal to a diameter of the bore 104 within which the spool 106 is disposed. The sealing lands seal the various galleries 110 within the bore 104 by sealing against the walls 112, thereby dictating the path that fluid forced into the bore 104 must take.

As shown in FIG. 1, a first outside sealing land 122 is located at a first end of the spool 106, a second outside sealing land 126 is located at an opposite end of the spool 106, and a central sealing land 124 is located between the first and second outside sealing lands 122, 126. A central body portion 120 of the spool 106 defines a central body portion diameter $Ø_C$ (depicted in FIG. 9), and each sealing land 122, 124, and 126 comprises a sealing land diameter $Ø_S$ (depicted in FIG. 9) that is greater than the central body portion diameter $Ø_C$. The space between two sealing lands defines an axial flow passage from the bore 104 to the ports 116. First and second peripheral sealing lands 132, 134 are located outside the first and second outside sealing lands 122, 126 and provide a surface against which the solenoids 128 may bias the spool 106.

Figure 2:
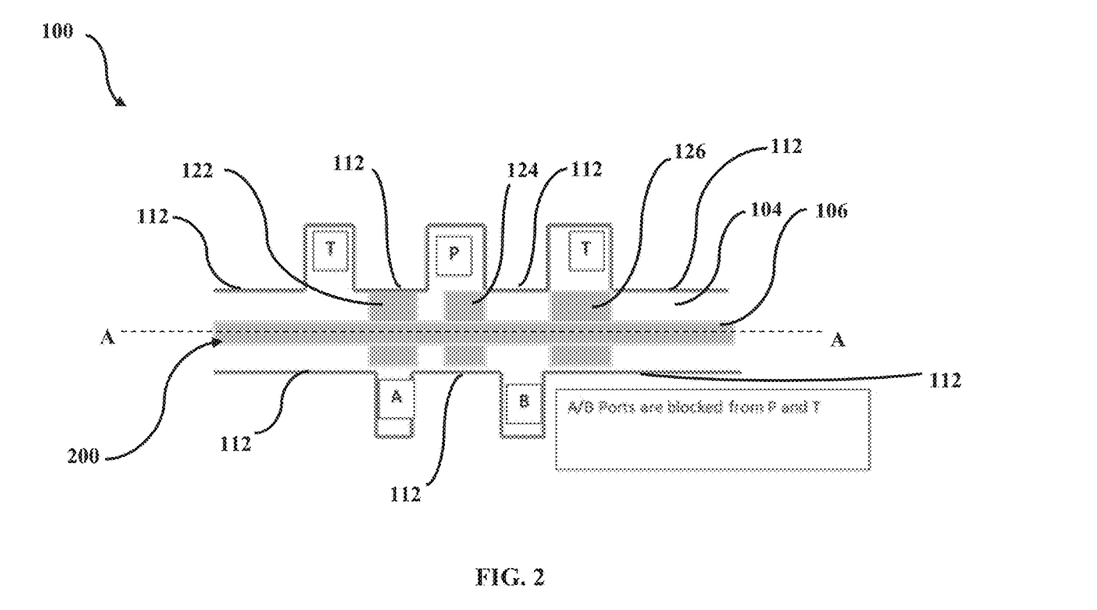
FIG. 2 is a diagram showing the spool valve of FIG. 1 in the first position.

FIG. 2 is a diagram showing the spool valve 100 in the first position 200. In the first position 200, the sealing lands 122, 124, 126 are in a sealing relationship with the walls 112 such that hydraulic fluid is prevented from flowing from the pump P to the service ports A and B of the cylinder C. Accordingly, no fluid may flow into or out of the service ports A and B of the cylinder C, and hydraulic fluid is also prevented from entering the hydraulic fluid tanks T.

Figure 3:
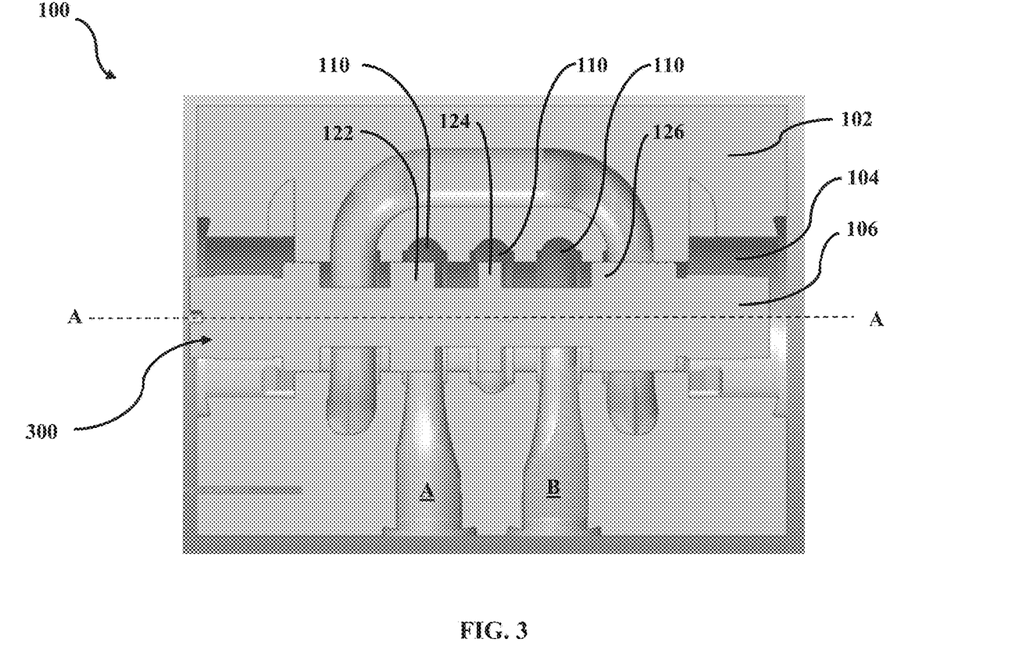
FIG. 3 is a side sectional view of the spool valve in a second position.
Figure 4:
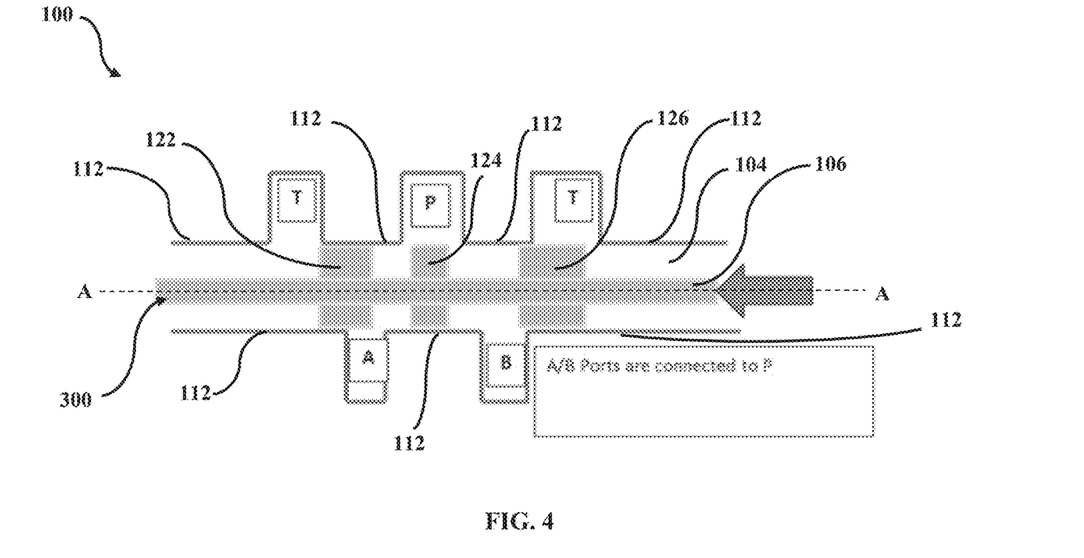
FIG. 4 is a diagram showing the spool valve of FIG. 3 in the second position.

FIG. 3 is a side sectional view of the spool valve 100 in a second position 300, and FIG. 4 is a diagram showing the spool valve 100 in the second position 300. In the second position 300, the spool 106 is positioned to the left along the body axis A-A with respect to the first position 200. As shown in FIGS. 3 and 4, the sealing lands 122, 124, 126 are in a first sealing relationship with the walls 112 such that hydraulic fluid can flow from the pump P into a volume of the bore 104 defined by the sealing lands and into both service ports A and B of the cylinder C. The hydraulic fluid that flows into the cylinder C drives the hydraulic piston HP from a rested state to an activated state for actuating a component of an industrial equipment. In the second position 300, the hydraulic fluid is prevented from entering the hydraulic fluid tanks T.

Figure 5:
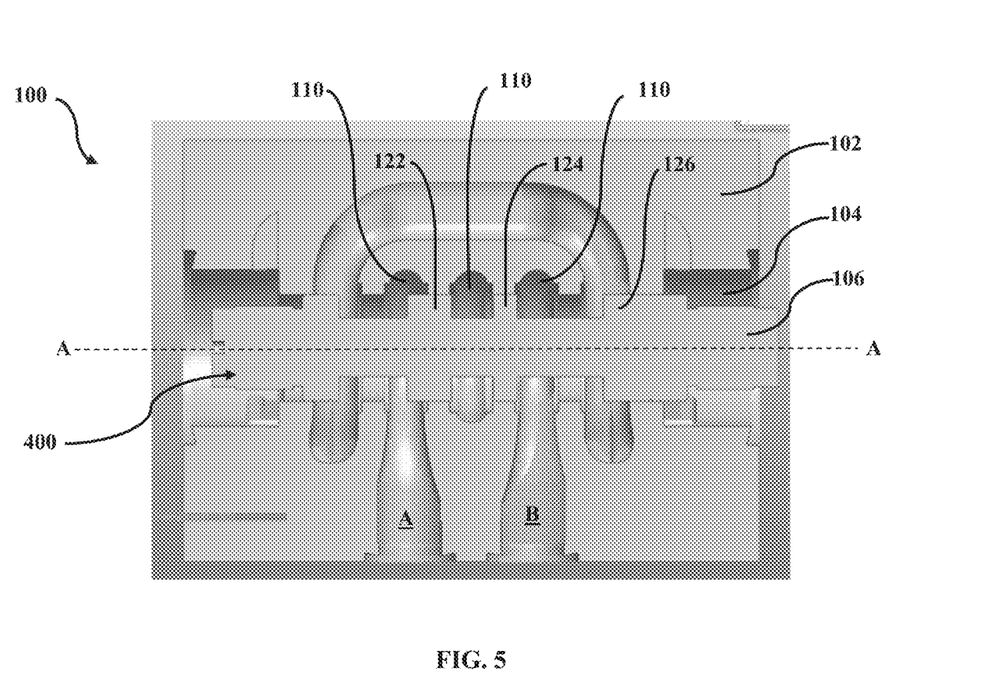
FIG. 5 is a side sectional view of the spool valve in a third position.
Figure 6:
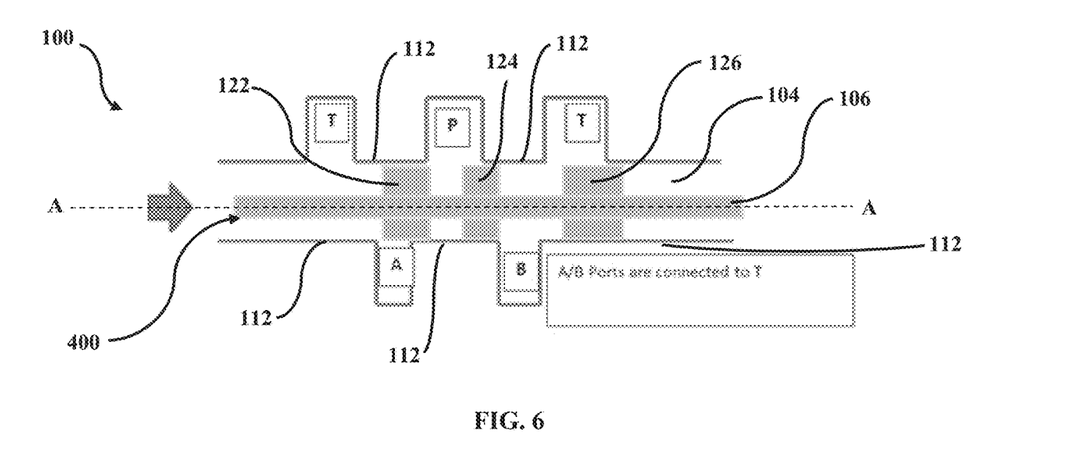
FIG. 6 is a diagram showing the spool valve of FIG. 5 in the third position.

FIG. 5 is a side sectional view of the spool valve 100 in a third position 400, and FIG. 6 is a diagram showing the spool valve 100 in the third position 400. In the third position 400, the spool 106 is positioned to the right along the body axis A-A with respect to the first position 200. As shown in FIGS. 5 and 6, the sealing lands 122, 124, 126 are in a second sealing relationship with the walls 112 such that hydraulic fluid in the cylinder C flows through the bore 104 via the service ports A and B and into the hydraulic fluid tanks T. This returns the hydraulic piston HP from the activated state to the rested state. In the third position 400, hydraulic fluid from the pump P is prevented from entering the service ports A and B of the cylinder C.

Figure 7:
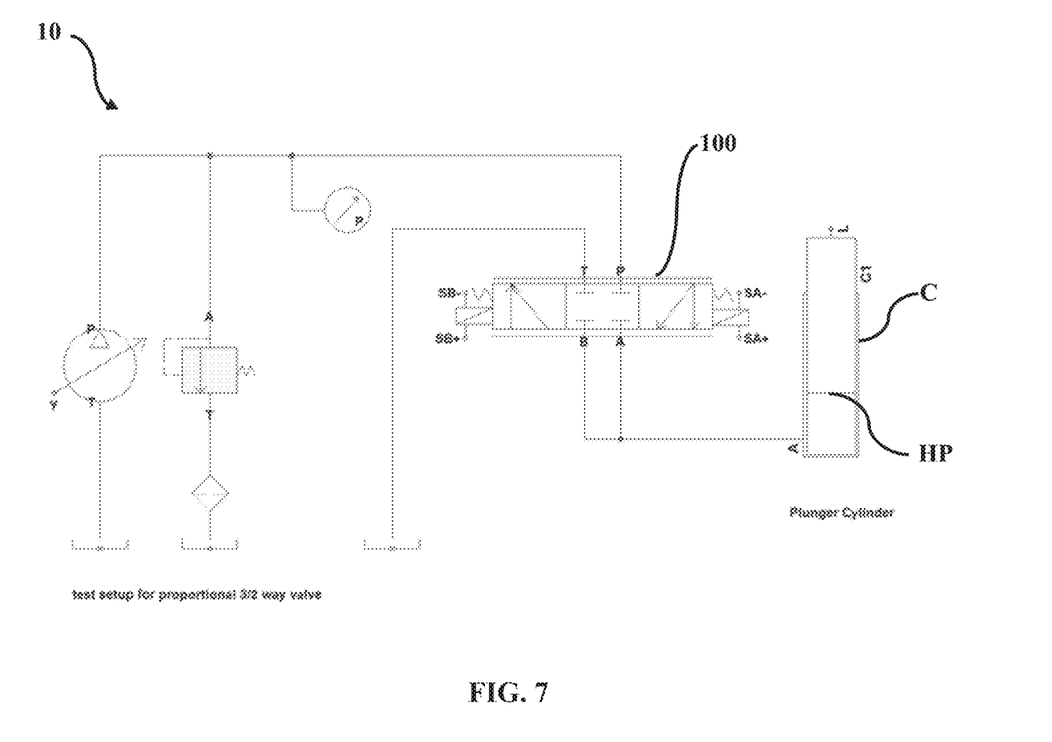
FIG. 7 is a test setup for a proportional 3/2 way valve.

FIG. 7 depicts an exemplary test setup 10 for the spool valve 100. In this example, the spool valve 100 is depicted as a proportional 3/2 way valve, however, the present disclosure is not limited to this type of valve and it is contemplated that the present disclosure is applicable to different valve types. The exemplary test setup 10 includes a pump P for supplying hydraulic fluid to the spool valve 100 and one or more hydraulic fluid reservoirs or tanks T for holding the hydraulic fluid. The spool valve 100 is connected to a cylinder C having a hydraulic piston HP via service ports A and B that merger together for supplying fluid to one side of the cylinder C.

In a typical CETOP 5 valve, fluid flow is limited to approximately 70 LPM/10 bar for a 4/3 way configuration that has two service ports A and B. In a 3/2 configuration, the fluid flow is similarly limited because the service port B is not used. The configuration of the spool 106 of the present disclosure increases the fluid flow to approximately 120 LPM/10 bar by providing the ability to supply hydraulic fluid to both services ports A and B at the same time, while allowing both service ports A and B to drain into the hydraulic fluid tanks T at the same time. Thus, the fluid flow can be increased without increasing the size of the valve and without using a two-stage valve. Although in this example the spool 106 is used in CETOP 5 valve size, it is noted that the present disclosure can be used for many different sizes such as, for example, CETOP 3, 5, 7, 10, and 16 sizes. Accordingly, the present disclosure is not limited to a particular hydraulic valve size.

Figure 8:
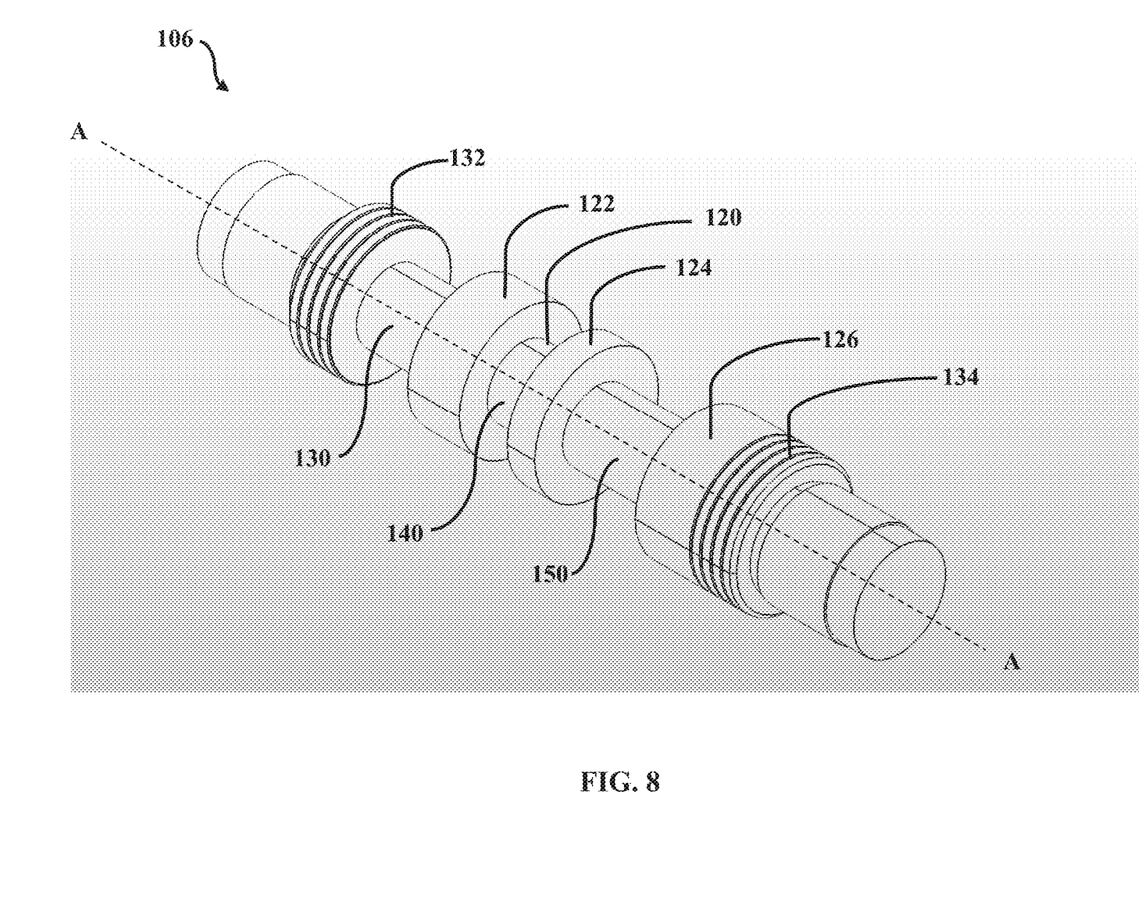
FIG. 8 is a perspective view of an exemplary spool.

FIG. 8 is a perspective view of the spool 106 removed from the spool valve 100. The first outside sealing land 122 is located towards a first end of the spool 106, the second outside sealing land 126 located towards an opposite end of the spool 106, and the central sealing land 124 located between the first and second outside sealing lands 122, 126. Also, the first and second peripheral sealing lands 132, 134 are located outside the first and second outside sealing lands 122, 126. The central body portion 120 includes three distinct segments. Each segment is defined as a length of the central body portion 120 between two adjacent sealing lands. A first outside segment 130 is defined as a length between the first peripheral sealing land 132 and the first outside sealing land 122; a central segment 140 is defined as a length between the first outside sealing land 122 and the central sealing land 124; and a second outside segment 150 is defined as a length between the central sealing land 124 and the second outside sealing land 126. It can be appreciated that in certain examples the spool 106 can be used in a switching valve or a similar type of valve.

Figure 9:
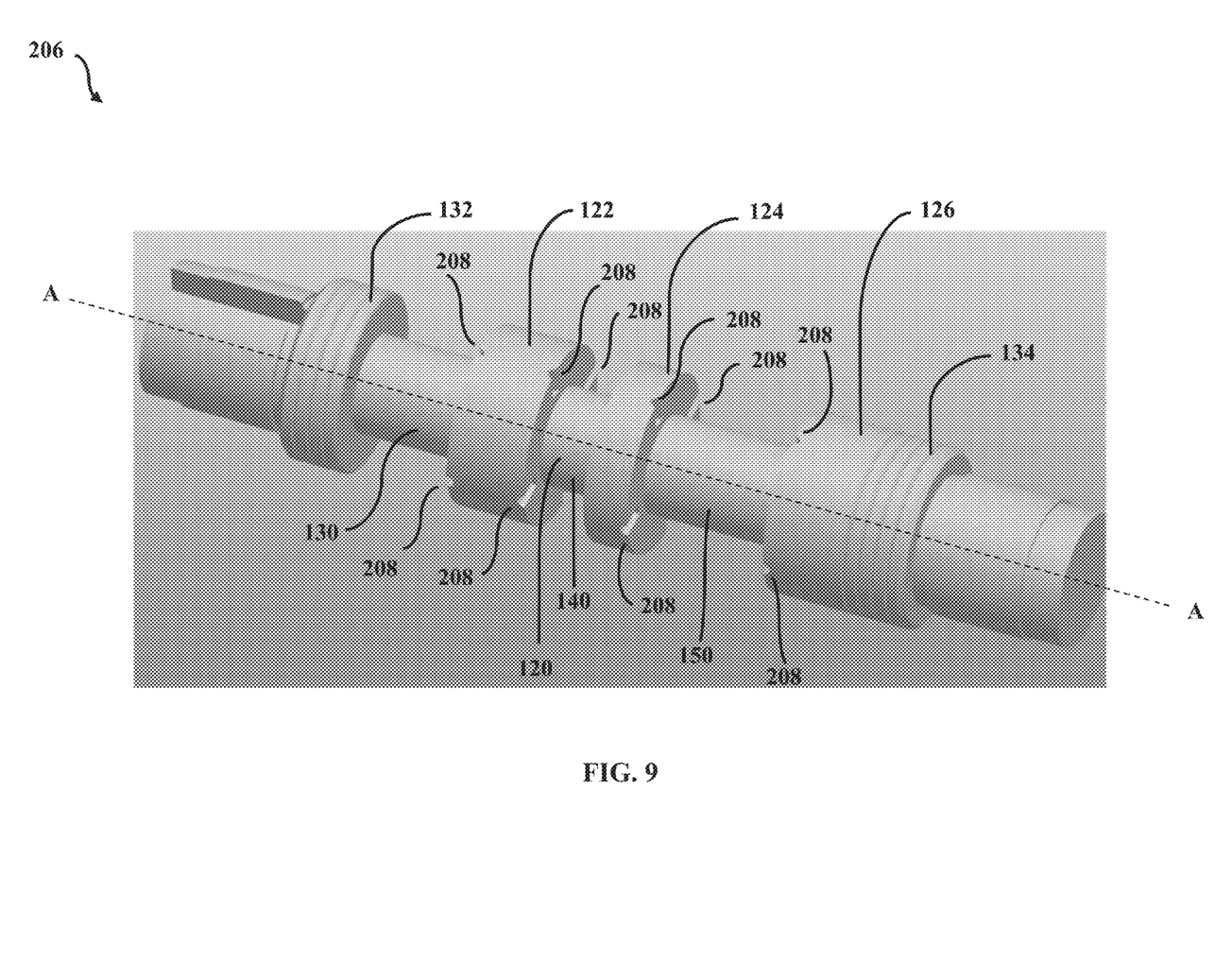
FIG. 9 is a perspective view of another exemplary spool having notches.
Figure 10:
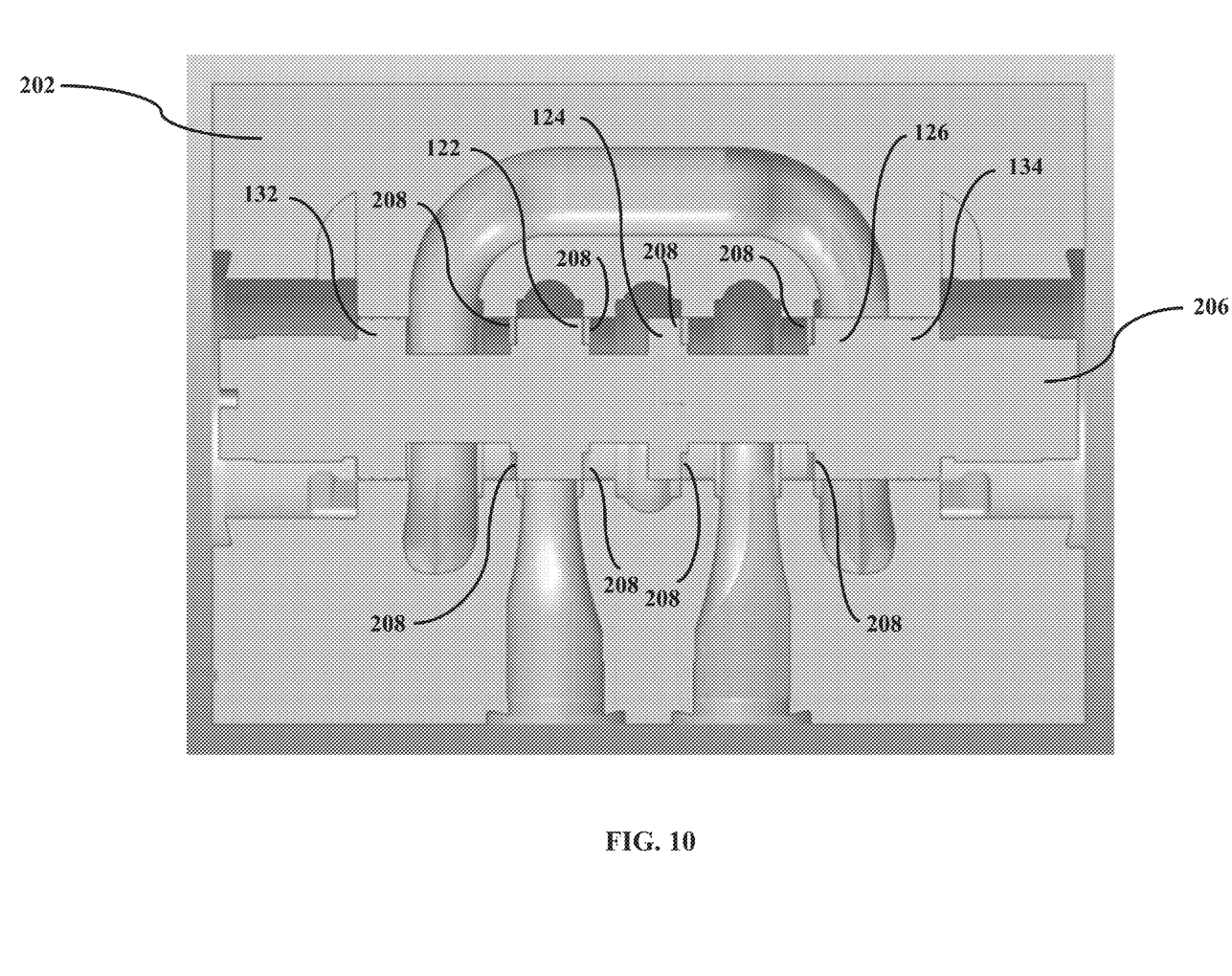
FIG. 10 is a side sectional view of the spool of FIG. 9 in a spool valve body.
Figure 11:
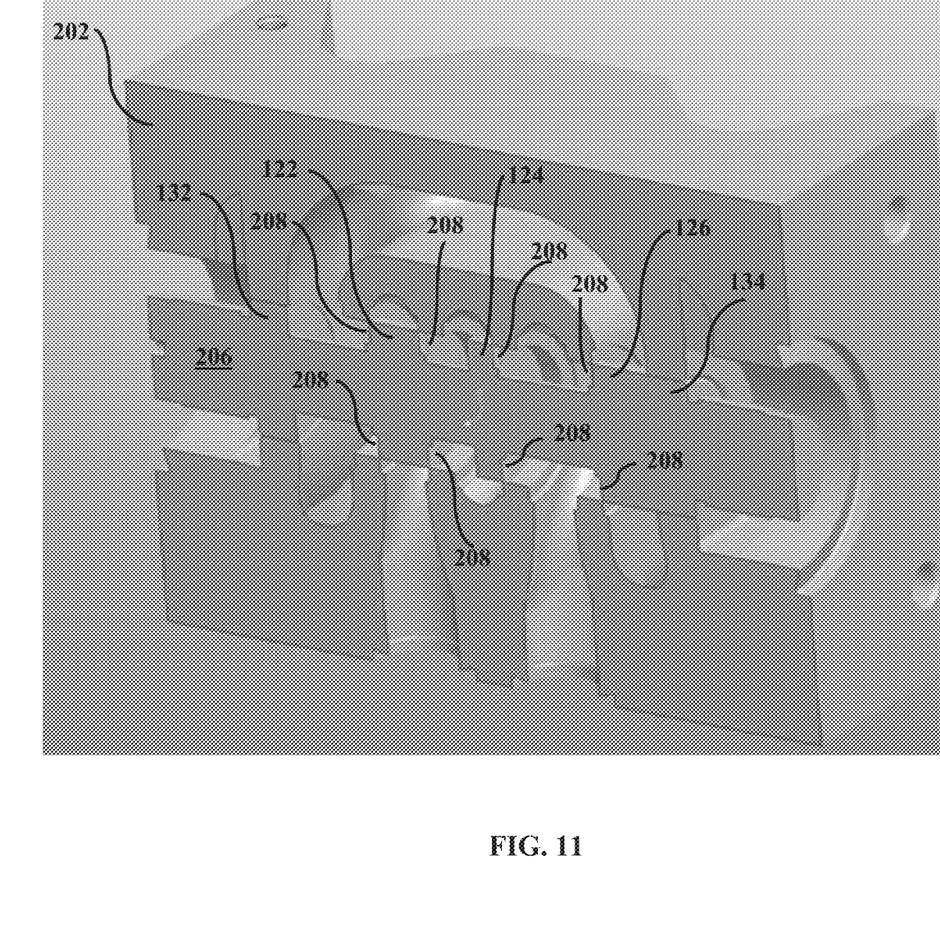
FIG. 11 is perspective sectional view of the spool of FIG. 9 in a spool valve body.

FIG. 9 is a perspective view of another example spool 206 in accordance with the present disclosure. The spool 206 shares many of the same components as the spool 106 described above. For example, the spool 206 includes a first outside sealing land 122 located towards a first end of the spool 206, a second outside sealing land 126 located towards an opposite end of the spool 206, and a central sealing land 124 located between the first and second outside sealing lands 122, 126. However, the sealing lands 122, 124, 126 on the spool 206 each include one or more notches 208 around the edge of one or more surfaces perpendicular to the central body portion 120 of the spool 206. The notches 208 can increase the metering of the spool 206 by increasing diameter of the axial flow passage between two sealing lands. The number and shape of the notches 208 may vary as needed or desired for a particular application. For example, a surface of a sealing land perpendicular to the central body portion 120 may have 1, 2, 3, 4, or more notches. Furthermore, the notches 208 can be rectangular, triangular, circular, semi-circular, compound-circular shaped etc. FIGS. 10 and 11 show the spool 206 in a spool valve body 202. In certain examples the spool 206 can be used in a proportional valve or a similar type of valve. It can also be appreciated that the spool 106 of FIGS. 1-6 can include notches, such as the notches 208 depicted in FIG. 9.

Figure 12:
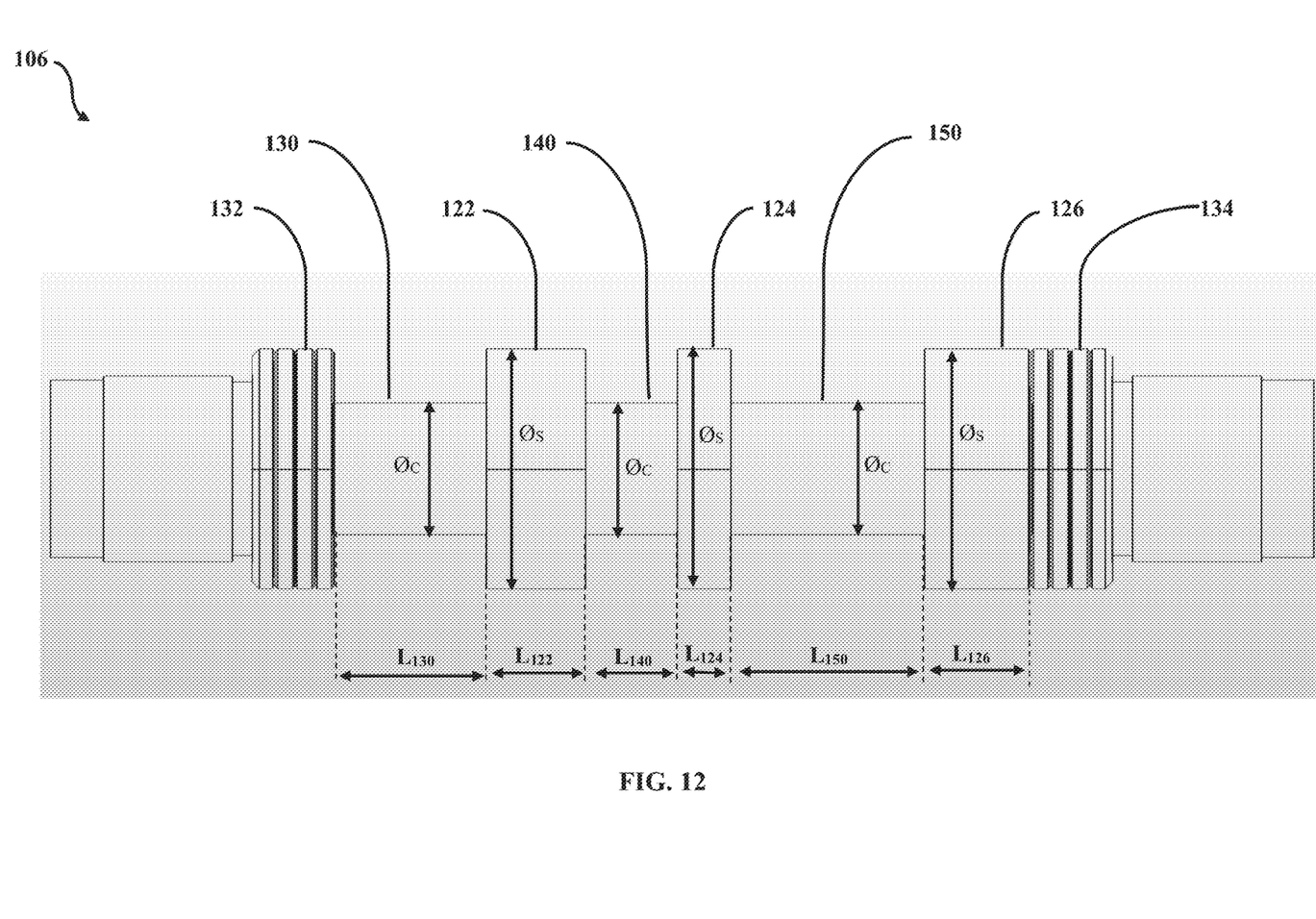
FIG. 12 is a dimensioned drawing of an exemplary spool.

FIG. 12 depicts a number of dimensions of the spool 106. The dimensions of the spool 106 may also apply to the spool 206 of FIG. 9. In general, the central body portion diameter $Ø_C$ is the smallest diameter on the spool 106. In the example of FIG. 12, the central body portion diameter $Ø_C$ is depicted as approximately the same or equal for each of the segments 130, 140, 150 of the central body portion 120. However, it is contemplated that in other embodiments, the central body portion diameter $Ø_C$ may vary between the segments 130, 140, 150 such that each segment has a distinct diameter. Also a radius, chamfer, and/or contour can be added to one or more of the segments 130, 140, 150 as needed or desired for a particular application for achieving an optimal performance of the spool 106. FIG. 12 further depicts each of the sealing lands 122, 124, 126 as having a sealing land diameter $Ø_S$. The sealing land diameter $Ø_S$ is the largest diameter on the spool 106, and is typically substantially equal to a wall diameter Øw formed by each wall 112 in the bore 104. More accurately, the difference in the sealing land diameter $Ø_S$ and the wall diameter Øw is minimal, such that the sealing lands 122, 124, 126 may pass through the bore 104 without interference. The tolerance between the sealing lands 122, 124, 126 and the walls 112 forms a seal when these components are aligned, thus dictating the flow of fluid through the bore 104. FIG. 12 further depicts the first outside segment 130 as having an axial length $L_{130}$, the central segment 140 as having an axial length $L_{140}$, and the second outside segment 150 as having an axial length $L_{150}$. FIG. 12 also depicts the first outside sealing land 122 as having an axial length $L_{122}$, the second outside sealing land 126 as having an axial length $L_{126}$, and the central sealing land 124 as having an axial length $L_{124}$.

Although many embodiments of the spool are contemplated, those having certain dimensional relationships have displayed highly desirable performance. In certain embodiments, the axial length $L_{124}$ of the central sealing land 124 may be about 10% to about 100% of the axial length $L_{122}$ of the first outside sealing land 122. In other embodiments, the axial length $L_{124}$ of the central sealing land 124 may be about 10% to about 100% of the axial length $L_{126}$ of the second outside sealing land 126. In certain embodiments, the axial length $L_{140}$ of the central segment 140 may be about 10% to about 100% the axial length $L_{130}$ of the first outside segment 130. In other embodiments, the axial length $L_{140}$ of the central segment 140 may be about 10% to about 100% the axial length $L_{150}$ of the second outside segment 150. Other dimensions are also contemplated. For example, the central body portion diameter $Ø_C$ may be about 10% to about 99% of the sealing land diameter $Ø_S$. It is contemplated that the dimensional relationships described herein may also apply to the spool 206 of FIG. 9.

Figure 13:
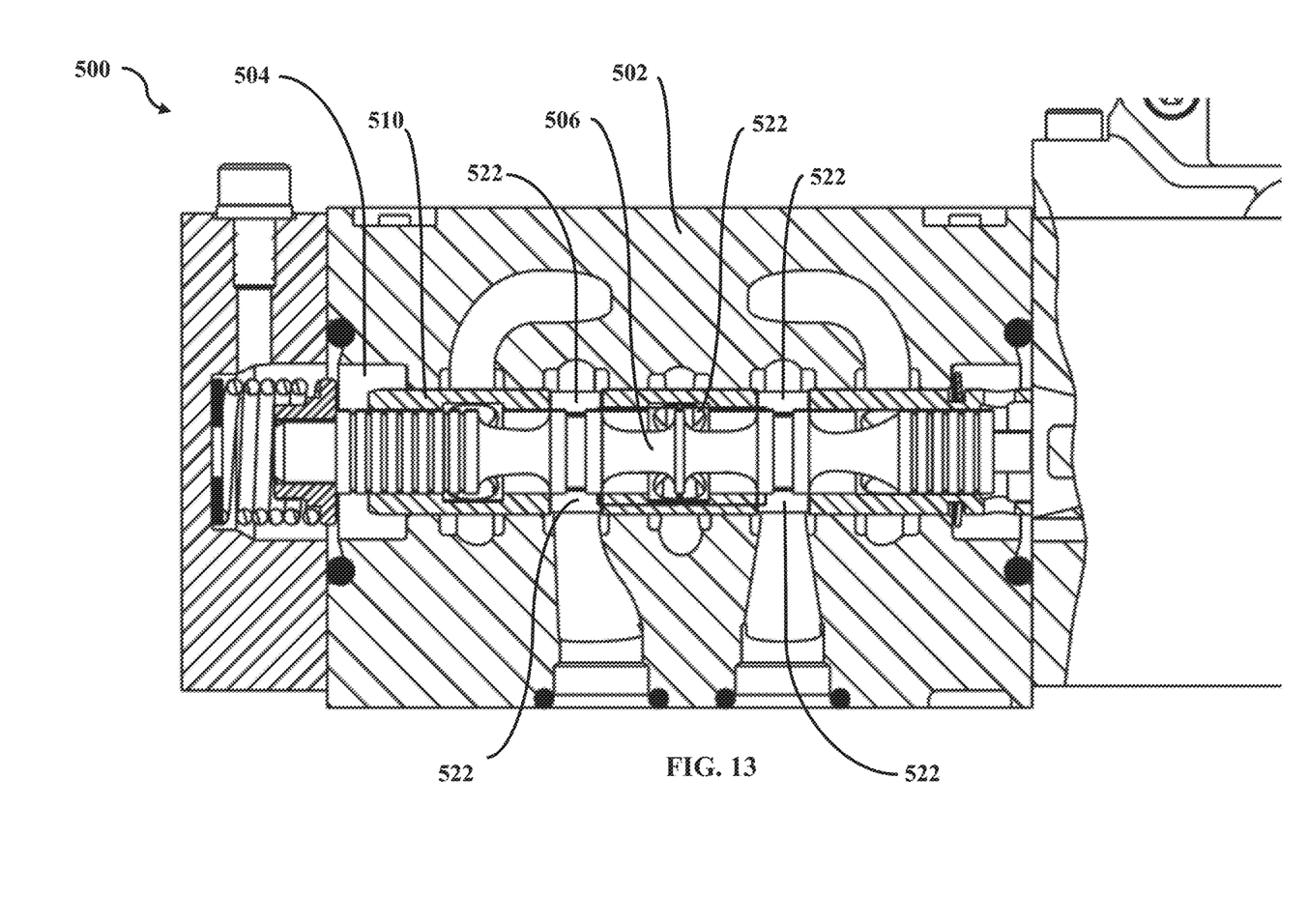
FIG. 13 is a side sectional view of an exemplary spool valve having a sleeve located between the valve body and the spool.

FIG. 13 shows another exemplary embodiment in accordance with the present disclosure in which a sleeve 510 is installed within a bore 504 of a spool valve 500. The sleeve 510 is located between a valve body 502 and a spool 506. The sleeve 510 comprises several portals 522 which have dimensional relationships that are similar to the sealing lands 122, 124, 126 described above with regard to the spool 106. It can be appreciated that in certain examples the sleeve 510 and spool 506 can be used in a high flow servo valve or a similar type of valve. In some examples, a sleeve, such as the sleeve 510 depicted in FIG. 13, can be included in the spool valve body 102 of FIG. 1, or can be included in the spool valve body 202 of FIGS. 11 and 12.

It is further contemplated that a desired valve performance can be achieved in accordance with the valve technology of the present disclosure by modifying the spool valve body 102 to have similar dimensional relationships as described above with regard to the sealing lands 122, 124, and 126 of the spool 106. For example, modifications to the spool valve body 102 can be made by changing the dimensional relationship between the galleries 110 and the walls 112 such as their location with respect to one another in the bore 104 of the spool valve 100.

As described above, the valve technology disclosed herein is not limited to a particular type of hydraulic valve. Rather, the valve technology disclosed herein may be used in various types of hydraulic valves such as switching valves, proportional valves, high flow servo valves or any other types of hydraulic valves. It is further noted that the various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A valve comprising:
a body defining a bore having a central axis and first and second work galleries defined by a plurality of walls;
a spool positioned within the bore, the spool having:
 a central body portion having a central body portion diameter; and
 a central sealing land positioned between first and second outside sealing lands on the central body portion, each sealing land has a sealing land diameter larger than the central body portion diameter;
solenoids on opposite ends of the spool, the solenoids configured to axially displace the spool along the central axis between first, second, and third positions, the first position being a centered, neutral position within the bore to which the spool is spring biased when the solenoids are deactivated, and the second position immediately following the first position and providing a first sealing relationship;
 wherein the first sealing relationship between the spool and the bore allows fluid to flow from a central pump gallery into both the first and second work galleries simultaneously, and the first and second work galleries are both fluidly connected to a service port of a hydraulic cylinder.

2. The valve of claim 1, wherein the central sealing land has an axial length that is 10% to 100% of an axial length of the first outside sealing land.

3. The valve of claim 1, wherein the central sealing land has an axial length that is 10% to 100% of an axial length of the second outside sealing land.

4. The valve of claim 1, wherein the central body portion diameter is 10% to 99% the sealing land diameter.

5. The valve of claim 1, wherein the central body portion includes a first outside segment between a first peripheral sealing land and the first outside sealing land, a central segment between the first outside sealing land and the central sealing land, and a second outside segment between the central sealing land and the second outside sealing land; and wherein the central segment has an axial length that is 10% to 100% an axial length of the first outside segment.

6. The valve of claim 5, wherein the central segment has an axial length that is 10% to 100% an axial length of the second outside segment.

7. The valve of claim 1, wherein the valve is a proportional 3/2 way hydraulic valve.

8. The valve of claim 1, wherein at least one of the sealing lands includes one or more notches around an edge of a surface perpendicular to the central body portion of the spool.

9. The valve of claim 1, further comprising a sleeve located between the body and the spool.

10. The valve of claim 9, wherein the valve is a servo valve.

11. A valve comprising:
a bore within a valve body having a central axis;
a plurality of galleries in the bore that define flow paths for hydraulic fluid; and
a spool positioned in the bore;
wherein the spool is moveable along the central axis between:
 a first position in which hydraulic fluid from a central pump gallery is prevented from flowing to first and second working galleries and from flowing to one or more tank galleries;
 a second position in which hydraulic fluid from the central pump gallery is in fluid communication with both the first and second working galleries simultaneously, and the first and second work galleries are both fluidly connected to a service port of a hydraulic cylinder; and
 a third position in which the first and second working galleries are in fluid communication with the one or more tank galleries simultaneously.

12. The valve of claim 11, wherein the valve is a proportional hydraulic valve.

13. The valve of claim 11, wherein the valve is a switching hydraulic valve.

14. The valve of claim 11, wherein the valve is a servo valve.

15. The valve of claim 11, wherein the second position is displaced with respect to the first position in a first direction, the third position is displaced with respect to the first position in a second direction, and the second direction being opposite the first direction on the central axis.

16. The valve of claim 15, further comprising solenoids on opposite ends of the spool, the solenoids configured to axially displace the spool between the first, second, and third positions.

17. The valve of claim 16, wherein each solenoid is adjacent to a peripheral sealing land positioned on a central body portion of the spool.

18. A valve comprising:
a body defining a bore having a central axis and first and second work galleries defined by a plurality of walls; and
a spool moveable within the bore between a first position, a second position, and a third position along the central axis, the spool having:
 a central body portion having a central body portion diameter; and
 a central sealing land positioned between first and second outside sealing lands on the central body portion, each sealing land has a sealing land diameter larger than the central body portion diameter; and
first and second solenoids on opposite ends of the spool, the first and second solenoids configured to axially displace the spool along the central axis between the first, second, and third positions, the second position being displaced with respect to the first position in a first direction, and the third position being displaced with respect to the first position in a second direction, the second direction being opposite the first direction on the central axis;
wherein the spool defines a plurality of sealing relationships that:
 in the first position, prevent fluid from flowing from a central pump gallery to the first and second work galleries and from entering a fluid reservoir;
 in the second position, allow fluid to flow from the central pump gallery into both the first and second work galleries simultaneously; and
 in the third position, allow fluid to flow from the first and second work galleries into the fluid reservoir.

19. The valve of claim 18, wherein the second position connects both the first and second work galleries to a service port of a hydraulic cylinder.

\* \* \* \* \*